US010803150B2

(12) United States Patent
Henderson

(10) Patent No.: US 10,803,150 B2
(45) Date of Patent: Oct. 13, 2020

(54) METHODS AND APPARATUS FOR DISPENSING RECORDED CONTENT

(75) Inventor: James Henderson, Fike (GB)

(73) Assignee: NCR Corporation, Atlanta, GA (US)

(*) Notice: Subject to any disclaimer, the term of this patent is extended or adjusted under 35 U.S.C. 154(b) by 1552 days.

(21) Appl. No.: 12/627,370

(22) Filed: Nov. 30, 2009

(65) Prior Publication Data
US 2011/0131591 A1 Jun. 2, 2011

(51) Int. Cl.
G06F 21/10 (2013.01)
G06Q 20/12 (2012.01)
G07F 17/16 (2006.01)
G06Q 20/18 (2012.01)
H04L 29/08 (2006.01)
G06F 17/00 (2019.01)
G06F 17/40 (2006.01)
G06F 11/00 (2006.01)

(52) U.S. Cl.
CPC ......... *G06F 21/105* (2013.01); *G06Q 20/123* (2013.01); *G06Q 20/18* (2013.01); *G07F 17/16* (2013.01); *H04L 67/2842* (2013.01); *G06F 11/00* (2013.01); *G06F 17/00* (2013.01); *G06F 17/40* (2013.01)

(58) Field of Classification Search
CPC . G06F 21/105; H04L 67/2842; G06Q 20/123; G06Q 20/18; G07F 17/16
See application file for complete search history.

(56) References Cited

U.S. PATENT DOCUMENTS

| 6,526,004 | B1* | 2/2003 | Otsuka et al. | 369/30.32 |
| 7,366,586 | B2* | 4/2008 | Kaplan | G07F 11/04 700/241 |
| 8,086,349 | B2* | 12/2011 | Blust | G07F 9/002 700/232 |
| 2003/0057219 | A1* | 3/2003 | Risolia | G06Q 30/0252 221/3 |
| 2004/0158871 | A1* | 8/2004 | Jacobson | 725/115 |
| 2004/0254676 | A1* | 12/2004 | Blust et al. | 700/231 |
| 2009/0166375 | A1* | 7/2009 | Butler et al. | 221/282 |
| 2010/0088772 | A1* | 4/2010 | Mullin | 726/30 |
| 2010/0211217 | A1* | 8/2010 | Hirsh et al. | 700/234 |

* cited by examiner

*Primary Examiner* — Florian M Zeender
*Assistant Examiner* — Nicole Elena Bruner
(74) *Attorney, Agent, or Firm* — Schwegman, Lundberg & Woessner

(57) ABSTRACT

Systems and techniques for self service delivery of content stored on removable media. A self service terminal stores a plurality of titles in a repository, and copies of titles are stored to removable media devices maintained in the self service terminal. In response to a user selection of an available title made during a transaction, a removable media device storing a copy of the selected title is delivered to the user. Anticipated demand is estimated and titles are stored to removable devices as needed to maintain an inventory to meet the estimated demand, including overwriting existing titles already stored on removable media, and overwriting returned media as needed.

11 Claims, 2 Drawing Sheets

METHODS AND APPARATUS FOR DISPENSING RECORDED CONTENT

FIELD OF THE INVENTION

The present invention relates generally to improved systems and techniques for dispensing of content, such as video and music. More particularly, the invention relates to a rental facility for recording content from a central repository onto a plurality of removable media devices and dispensing removable media devices for rental in response to user selections

BACKGROUND OF THE INVENTION

Rental of recorded content is widely used and highly popular, and increasing capabilities for information retrieval and processing have allowed for self service rental of even relatively high value products, such as recorded video. Typical rental of recorded video involves the maintaining of an inventory of prerecorded video items, such as movies recorded on DVD or Blu-ray, and the dispensing of selected items to a consumer upon proper payment. A record is kept of the inventory item that has been rented and of a consumer's payment details, so that the item can be recognized when returned, and so that additional charges can be imposed if the item is not returned as agreed.

Maintaining an inventory of prerecorded items presents a number of drawbacks. In order to satisfy user demand, a number of copies of each item must be stored in a facility. It will always be difficult to predict the vicissitudes of consumer desires at any particular time, so that the risk will always exist of running out of one or more popular titles, leading to consumer dissatisfaction. It is possible to prevent such an occurrence by stocking large quantities of every title, but such a practice inevitably involves the purchase of more inventory than is needed, and an accompanying excess expense. In addition, a typical self service facility will typically be relatively small, and prior art self service facilities are generally dedicated to dispensing of current popular titles, in order to maximize revenue while managing expenditures for rental or purchase of space.

SUMMARY OF THE INVENTION

In its several aspects, the present invention provides improved systems and techniques for recording items such as movie titles at a self service facility, storing the titles, and dispensing titles in response to rental requests. The invention recognizes that copying titles onto optical media such as digital versatile disc (DVD) and Blu-ray discs, presents difficulties because of the time required and the space that must be dedicated to storing the blank and recorded disks. The invention recognizes that numerous mechanisms now exist for recording large amounts of content onto removable media devices such as memory cards, particularly cards conforming to the SECURE DIGITAL™ card standard, and that the use of such cards allows for faster recording and a substantial savings of space over the use of optical media. SECURE DIGITAL™ cards allow for the use of digital rights management, so that content can be stored on a card using digital rights management in such a way that it can be played from the card, but cannot be played if copied to another storage device.

A self service facility according to an aspect of the present invention includes an inventory of titles, all stored in a mass storage device such as a relatively high capacity hard drive. The facility includes a plurality of interface slots for removable memory cards, and store of memory cards, together with a mechanism for moving cards between a return slot, an interface slot, and a dispensing slot. The facility includes a processor for selecting titles and writing titles onto memory cards in a secure manner. A title may be written onto a card at any time, and the processor manages inventory by estimating demand and writing titles onto cards as needed to meet demand. When a title is dispensed, a new card may be retrieved and written with either the same title or a different title, depending on estimated needs. If demand patterns are different than anticipated, leading to a prospective shortage of one or more titles, cards storing other titles may be overwritten with the title in higher demand. In addition, if no copies of a title are immediately available in response to a user's selection, the user may be notified that the title is not immediately available, but can be written in a relatively short time, giving the user the opportunity to return and conduct the transaction. For example, if a kiosk is placed at a grocery store, the user may be notified that the title can be made available and may place the order, and may return to collect the selected item after shopping for groceries. If the user does not conduct the transaction, the title may be retained, or another title may be written to the card.

A more complete understanding of the present invention, as well as further features and advantages of the invention, will be apparent from the following Detailed Description and the accompanying drawings.

DETAILED DESCRIPTION

Figure 1:
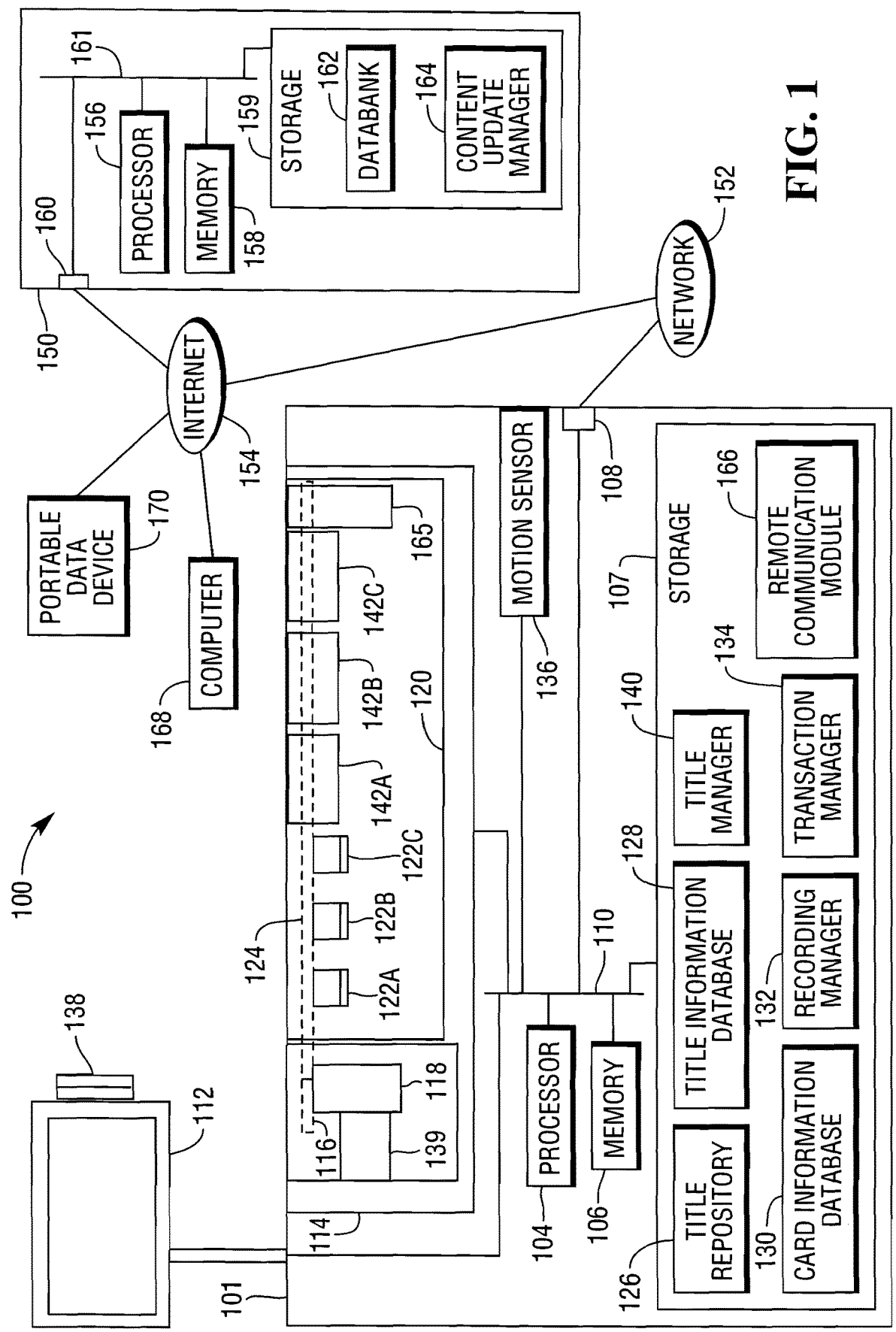
FIG. 1 illustrates a recording and self service dispensing system according to an aspect of the present invention.

FIG. 1 illustrates a recording and self service dispensing system 100 according to an aspect of the present invention. The system 100 includes a terminal 101, which may be operated as a point of sale kiosk, comprising processor 104, memory 106, storage, such as hard drive 107, and network interface 108, communicating over a bus 110. The terminal 101 further includes a display 112, which may be a touch screen display, and a card receiving, storage, and writing unit 114. The card receiving, storage and writing unit 114 includes a receiving slot 116, a storage bin 118, a sorting and dispensing unit 120 including a plurality of interface slots 122A-122C, and a transfer mechanism 124, for transferring a memory device such as a SECURE DIGITAL™ card between the receiving slot 116 and the storage bin 118, between the storage bin 118 and the sorting and dispensing unit 120, and into and out of one of the plurality of interface slots 122A-122C as memory devices are delivered to the interface slots 122A-122C for recording of media and delivery to users.

The system 100 stores a plurality of movie titles, suitably residing in a repository 126 stored on the hard drive 107. The system 100 also stores a title information database 128, which includes information relating to the different titles, including transaction information for rentals of different titles, release dates of titles, dates titles entered the inventory, and other information, such as user and critic ratings, box office popularity, category, and other information useful for helping a user to select a title and for estimating the popularity of a title. The system 100 also stores a card information database 130, which includes information relating to each memory card. The information includes an identifier for each card, an indication as to whether the card is present or rented, the title stored on each card, and an indication as to whether the card is presently being recorded.

The system 100 implements a recording manager 132 and a transaction manager 134, suitably implemented as software residing on the hard disk 107 and transferred to memory 106 as needed for execution by the processor 104. The recording manager 132 constantly examines the title information database 128 and the card information database 130, to insure that the currently recorded inventory is balanced with expected demand as much as possible. The recording manager 132 estimates the number of each title needed, making demand projections based on information stored in the title information database 128, and directs recording of titles as needed to make sure that the estimated number of prerecorded copies of each title is present, so that a copy of each desired title will be available to be dispensed to a user on demand. If the estimated number of required copies of a particular title changes, more copies of that title may be recorded, or cards storing that title may be overwritten with copies of a different title.

The transaction manager 134 may suitably control the system 100 to provide information to a user and receive inputs and selections from the user, and deliver a recorded card in accordance with the selections. Between transactions, the transaction manager 134 may suitably operate in an "attract" mode, for example, presenting images of popular attractions, or alternating between images of selected titles. When the transaction manager 134 detects an approach of a user, for example, through a signal provided by a motion sensor 136, or through a user's touching of the display 112, the transaction manager 134 presents an initial selection screen. The selection screen may present choices in any arrangement desired. For example, a selection of the most popular choices may be presented, along with navigational icons allowing the user to navigate through further available selections. Navigational icons present on the initial screen may, for example, allow for the selection of newest choices, top 10 of each of a variety of categories, or navigation to a standard navigational screen allowing for more comprehensive selection and searching. When a user has selected one or more titles, transaction details are presented to the user for acceptance. The user accepts the transaction details and makes payment, for example, by presenting a payment card to a reader 138 or authorizing a debit using stored account details.

Upon payment by the user, the selected title or titles are dispensed by retrieving a card storing each of the selected titles from an appropriate receptacle in the receiving, storage, and writing unit 114, and delivering the card or cards to the customer. Each card is preferably delivered to the user by allowing the user to remove the card from a slot in which the card can be read, so that the removal of the card from the slot can be detected. The recording manager 132 preferably examines the card to make sure it is not defective before it is dispensed to the user. If the recording manager 132 detects that the card is defective, the card may be delivered to a reject bin 139 so that it is removed from service.

Whenever a card is dispensed, the title database 128 and the card database 130 are updated with information relating to the transaction, and a title manager 140 evaluates inventory and estimates demand to determine if inventory needs to be rebalanced. If blank cards are present, a blank card may be retrieved from the storage bin 118 and delivered to one of the slots 122A-122C for recording of a new copy of the title that was just dispensed. If a new copy of the title is not needed, a different title may be recorded, or no recording may be made. Because cards can be written to as often as desired, it may be desirable not to maintain any blank cards, but to record titles until all blank cards have been recorded to, overwriting titles in lower demand as titles in higher demand are needed.

Each title is recorded using digital rights management (DRM), which protects content so that the content can be used only in ways specified by DRM information. One mechanism for implementing DRM is to encrypt content in such a way that it can be decrypted using a key stored so that the key is not accessible to the user. Content recorded using DRM may be streamed to playing software, with a decryption mechanism interposed between the stored content and the playing software. The key is used to decrypt content as it is streamed, so that only a small unencrypted portion exists at any particular time, and a complete unencrypted copy of the content never exists. The key may depend on information unique to a particular storage device, so that the content will not be playable if an unauthorized transfer to another storage device is performed. DRM information accompanying stored content may also include information such as playback restrictions to prevent transfer to or storage on other devices, or to limit the number of times content may be transferred or played, and may also include information such as an expiration date after which content will no longer be playable.

Typically, SECURE DIGITAL™ cards are designed so as to be compatible with copy protection for recorded content (CPRM), a proprietary standard whose details are available only to licensees. Titles may therefore conveniently be recorded using CPRM.

When a return is detected through the placing of a card in the receiving slot 116, the transaction manager 134 reads the identifier from the card and credits the return to the user's account upon identification of the card. The transaction manager 134 presents a display appropriate to the return, such as a message thanking the user for the return, or informing the user of any late fees that may be assessed. The card may be examined by the recording manager 132 to determine if it is defective and transported either to the storage bin 118 or the reject bin 139. Whenever the returned card or another card is needed for recording of a title, a card is retrieved from the storage bin 118 and transported to an unoccupied one of the interface slots 122A-122C. Once the card has been recorded, it is transported to the sorting and dispensing unit 120. The sorting and dispensing unit 120 holds the card in one of a plurality of receptacles 142A-142C dedicated to cards recorded with the same title.

The system 100 may also include a remote server 150, making new content available to the terminal 101. The terminal 101 communicates with the remote server 150 over a network 152, which may provide access to the public Internet 154. The server 150 may suitably include a processor 156, memory 158, storage 159, and network interface 160, communicating over a bus 161. The storage 159 may suitably comprise a large databank 162 comprising multiple hard drives with the databank having a very large capacity. The databank 162 may suitably store a large number of titles, which may be made accessible to terminals such as the terminal 101 upon request. The server 150 may suitably employ a content update manager 164, which may be implemented as software stored on the storage 159 and transferred to memory 158 as needed for execution by the processor 156. The content update manager 164 monitors the databank 162 to identify newly stored titles, which may be delivered to terminals such as the terminal 101 as desired, such as periodically, or in accordance with information received from the terminals indicating the types of titles most in demand at any particular terminal. For example, new titles may include new releases, which may be delivered to terminals as they are released. New titles may also include older titles that have been newly added to the databank 162, such that various titles may not be in much demand at some terminals, but may be in greater demand at other terminals. Such titles may be delivered to a terminal based on the expectation that a title will appeal to the users of that terminal.

The content update manager 164 may also receive requests from terminals for specific titles. For example, in response to a request for a specific title, the transaction manager 132 may search not only the current stock of titles stored on the terminal 101, but may also communicate with the server 150. The content update manager 164 may receive the request and survey the databank 162. If the requested title is found, the transaction manager 134 may deliver a message to the user stating that the title is available and can be transferred to the terminal 101 for the user, but that retrieval will take a longer than usual time, such as several hours or overnight. If the user requests that the transfer be accomplished, the title manager 140 retrieves the title from the server 150, and the title is stored for delivery to the user when the user visits the terminal 101 again. If the user does not return to the terminal 101 to request the title, the title may be retained for other users or deleted, as desired.

As an additional alternative, a user may wish to present his or her own memory card for recording in cases in which recording may take longer than a user would normally wish to spend in the vicinity of the terminal 101. Therefore, the terminal 101 may provide a secure receptacle 165 for holding cards presented by users and which are to be returned to users. A user may conduct a transaction, for example, upon entering a supermarket where the terminal 101 is placed, and present a card for recording. The title selected by the user will be written to the card, and the card will then be held in the secure receptacle 165 and delivered to the user upon the user's return to the terminal 101.

The terminal 101 may also support remote communication from users, allowing users to examine available inventory and issue requests so that titles may be recorded to a card before the user comes to the terminal 101, or may be retrieved from the server 101 and recorded on a card. The terminal 101 thus implements a remote communication module 166, which may allow for communication from a user's personal computer 168 or portable data devices. The remote communication module 166 mediates communication between such remote devices and the transaction manager 134, allowing a user to make appropriate selections so that the desired titles will be ready and the transactions can be concluded when the user arrives at the terminal 101.

Figure 2:
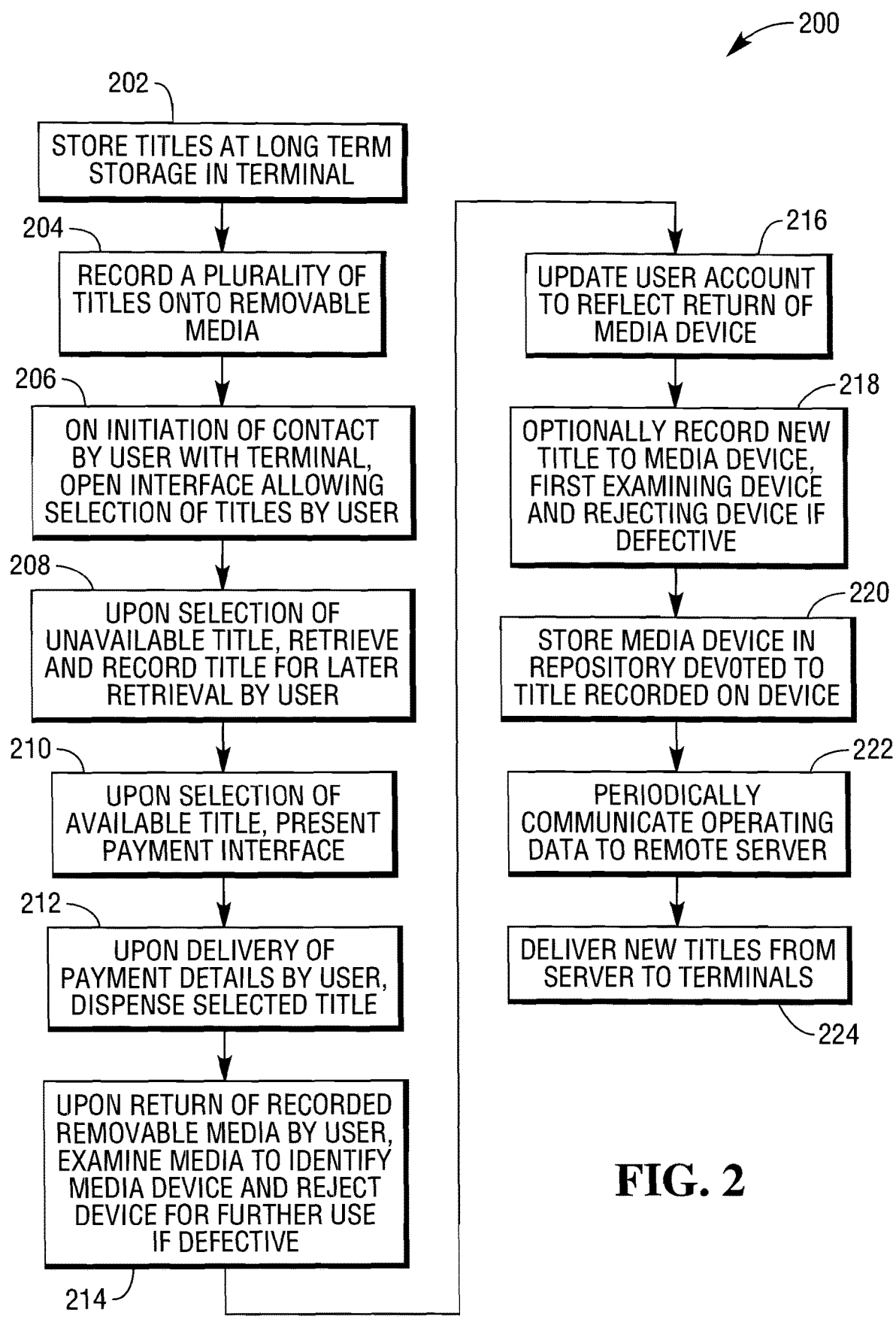
FIG. 2 illustrates a process of recording and self service dispensing according to an aspect of the present invention.

FIG. 2 illustrates the steps of a process 200 according to an aspect of the present invention. The process 200 may suitably be carried out using a system such as the system 100 of FIG. 1. At step 202, a plurality of titles are stored in long term storage at each of a plurality of rental terminals. At step 204, copies of a selection of the titles at each terminal are recorded onto removable media such as memory cards, suitably using digital rights management in the recording, with each card suitably being examined before recording to determine if the card is defective and rejecting the card if it is defective. Titles may be recorded in a number of formats, such as a full size format suitable for a player connected to a high definition television, or a small screen format suitable for presentation on a portable player.

At step 206, upon initiation by a user of contact with a terminal, a processor is controlled so as to open an interface allowing selection of titles by the user. The initiation of contact may be accomplished through direct interaction of the user with the terminal or remotely, with remote interaction allowing the user to select titles to be recorded to a device to be collected by the user when the user arrives at the terminal.

At step 208, upon selection by a user of a specific title not currently stored at the terminal, or one presently stored at the terminal but not recorded on a removable memory card, the processor is controlled to retrieve the title from a remote server and store the title for later delivery to the user. If desired, the user may be allowed to present his or her own device for recording, and the device may be held securely for delivery to the user once the desired title has been recorded.

At step 210, upon selection of an available title by the user, the processor is controlled so as to present a payment interface. At step 212, upon delivery of payment details by the user, the selected title is dispensed in the form of a removable memory card.

At step 214, upon return of a recorded media device by a user, details are read from the device to identify the media device and the device is examined and rejected for further use if defective. At step 216, the processor is controlled to update stored information crediting the user's account for the return and debiting the account for any associated fees, such as late fees. At optional step 218, a new title is recorded to the returned media device, with the device being first examined and rejected if it is defective. At step 220, the card is delivered to a repository devoted to the title stored on the card.

At step 222, the processor at each terminal is periodically controlled to communicate data to the remote server, indicating user selection patterns. At step 224, the server periodically delivers new titles to each terminal based on selected criteria.

While the present invention is disclosed in the context of a presently preferred embodiment, it will be recognized that a wide variety of implementations may be employed by persons of ordinary skill in the art consistent with the above discussion and the claims which follow below.

I claim:

1. A method of recording and dispensing, comprising a processor executing non-transitory computer-readable instructions, the method further comprising:
   providing the non-transitory computer-readable instructions to the processor;
   executing, by the processor, the non-transitory computer-readable instructions for:
   recording, utilizing copy protection for recorded content standard, a plurality of titles to a title repository integrated into a self service terminal (SST);
   communicating, by the processor, with a user device of a user through a remote communication module of the SST and causing, by the processor through the remote communication module, a presentation of the plurality of titles for selection by the user on and from the user device;
   controlling, by the processor, presentation of a user interface of the SST and allowing the user to enter into a transaction for delivery to the user of one or more of the recorded titles by presenting an initial selection screen on the SST when a motion sensor of the SST detects the user approaching the SST;

maintaining, by the processor, a card information database on the SST, wherein the SST includes each of the removable memory card devices and the card information database maintaining, by the processor, for each of the removable memory card devices: i) a card identifier that is unique to the removable memory card device that the card identifier is assigned to, ii) a first indication as to whether the removable memory card device having the first indication is rented, iii) a second indication as to whether the removable memory card device having the second indication has any stored title stored thereon, and iv) indications as to a particular one of the stored titles that is stored on a particular removable memory card device, wherein maintaining further includes detecting, by the processor, when one or more blank removable memory card devices are present in the SST;

writing, by the processor, particular titles, that have been purchased recently by previous users with a frequency reflecting in-demand titles, to the one or more blank removable memory card devices until all of the blank removable memory card devices include copies of the particular titles, and overwriting, by the processor, less in demand ones of the stored titles with the particular titles as needed for the particular titles based on demand for the particular titles, wherein less in: demand titles have been purchased with a lower frequency than the frequency reflecting the in-demand titles;

wherein writing further includes:
  examining, by the processor, each of a plurality of removable memory card devices that is to be dispensed from the SST, each of the plurality of removable memory card devices interfaced to the SST and compatible with the copy protection for recorded content standard;
  determining, by the processor, whether any one of the plurality of removable memory card devices is a defective removable memory card device;
  when any one of the plurality of removable memory card devices is a defective removable memory card device, delivering, by the processor, the defective removable memory card device to a rejected card bin of the SST to remove the defective memory card device from any further service by a memory card transfer mechanism;
  delivering, by the processor, each of the plurality of removable memory card devices that are not the defective removable memory card device to a storage bin of the SST;
  retrieving, by the processor, each of the plurality of removable memory card devices from the storage bin;
  transporting, by the processor, each of the plurality of removable memory card devices to an unoccupied one of a plurality of interface slots internal to the SST;
  writing, by the processor, the recorded titles to each of the plurality of removable memory card devices as stored titles;
  transporting, after the recording and by the processor, each of the plurality of removable memory card devices to a sorting and dispensing unit of the SST, the sorting and dispensing unit holding each of the plurality of removable memory card devices in one of a plurality of receptacles dedicated to removable memory card devices recorded with the same title;

upon a selection by the user of an available title through the initial selection screen, controlling, by the processor, to deliver one of the removable memory card devices having the selected available title as a particular stored title;

wherein controlling further includes:
  detecting, by the processor, when the user provides a user-provided memory card for the transaction in a secure receptacle of the SST and using, by the processor, the user-provided memory card as the one removable memory card for the transaction;
  obtaining, by the processor, a key that depends on information unique to the corresponding removable memory card device;
  employing, by the processor, the memory card transfer mechanism by encrypting the particular stored title on the corresponding removable memory card device with the key; and
  storing, by the processor, the key on the corresponding removable memory device as a decryption key; and
  processing, by the corresponding removable memory card device, the key and decrypting a portion of the particular storage title as that portion is streamed for playing from the corresponding removable memory card device;

wherein processing, by the corresponding removable memory card device further includes:
  maintaining, by the corresponding removable memory card device, a complete unencrypted copy of the particular stored title that is never available from the corresponding removable memory card device.

2. The method of claim 1, further comprising protecting each stored title stored to a certain removable memory card device using digital rights management (DRM) information that includes a particular key unique to the certain removable memory card device, wherein the DRM information is compatible with the copy protection for recorded content standard.

3. The method of claim 1, further comprising crediting an account of a returning user who previously received a certain removable memory card device.

4. The method of claim 1, further comprising periodically communicating with the remote server to receive new titles for storage within the title repository of the SST as new stored titles.

5. The method of claim 4, further comprising controlling the processor to maintain transaction records and periodically examining the transaction records to estimate anticipated demand, and to control the processor to select recorded titles for storing to corresponding removable memory card devices so as to maintain an inventory of stored titles based on an anticipated demand.

6. The method of claim 3, further comprising overwriting a particular stored title stored on the certain removable memory card device returned by the returning user with a new recorded title.

7. The method of claim 1, further comprising notifying the user if a requested recorded title is not immediately available and storing the requested recorded title to a certain removable memory card device as a requested stored title for later selection by the user when the requested recorded title becomes available from a certain memory card device of the SST.

8. The method of claim 1, further comprising receiving a user device for recording of a requested stored title and holding the user device for later delivery to the user once the requested stored title is available and stored on the user device.

9. The method of claim 1, further comprising:
  directing the recording of the recorded titles as needed.

10. The method of claim 9, further comprising:
  overwriting one recorded title with a different recorded title.

11. The method of claim 1, wherein the memory card devices conform to SECURE DIGITAL™ card standard.

* * * * *